Dec. 13, 1938.  C. A. TEA  2,139,780
WEATHER STRIP
Filed March 27, 1936     2 Sheets-Sheet 1
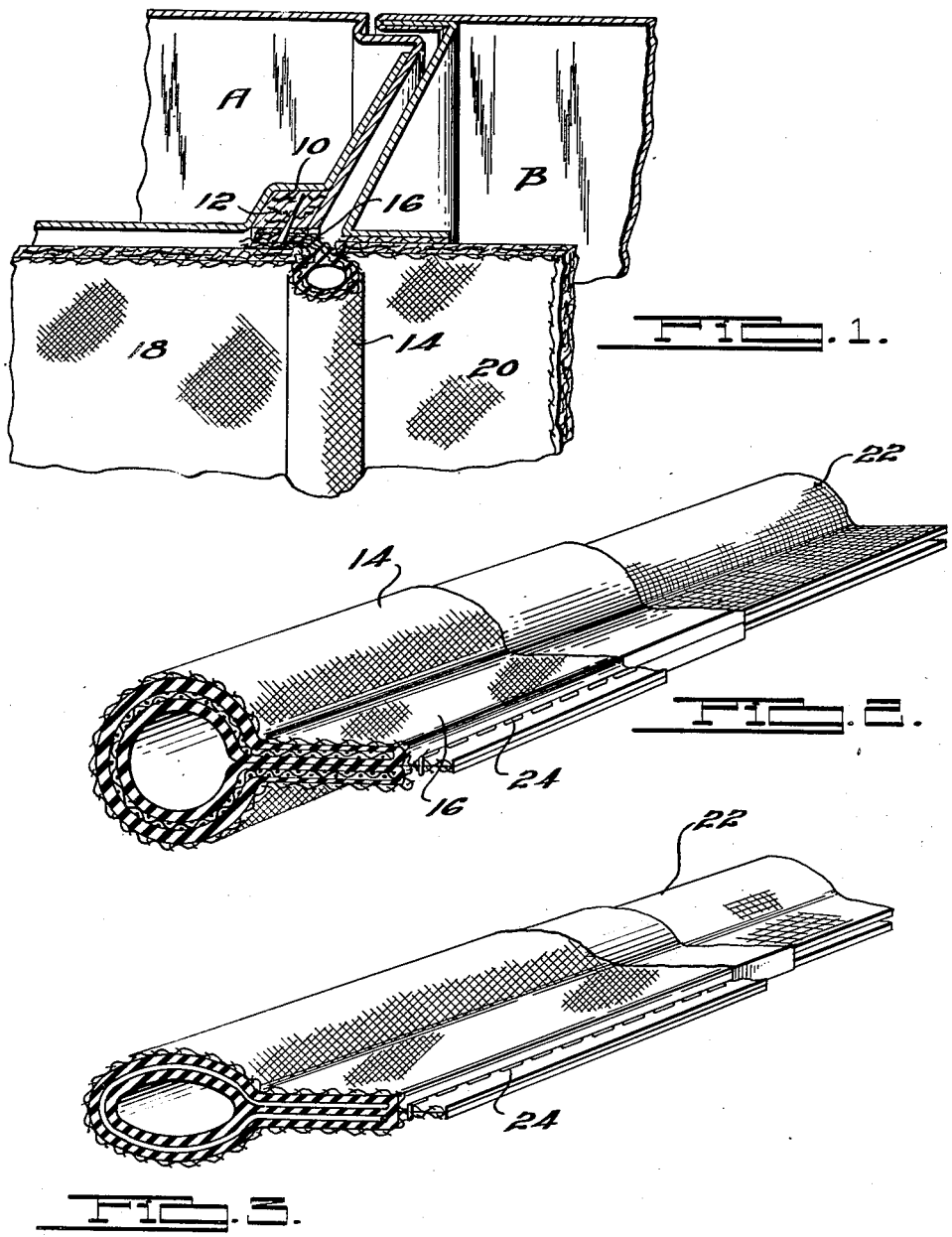
INVENTOR.
Clark A. Tea.
BY
ATTORNEYS.

Dec. 13, 1938.   C. A. TEA   2,139,780
WEATHER STRIP
Filed March 27, 1936   2 Sheets-Sheet 2
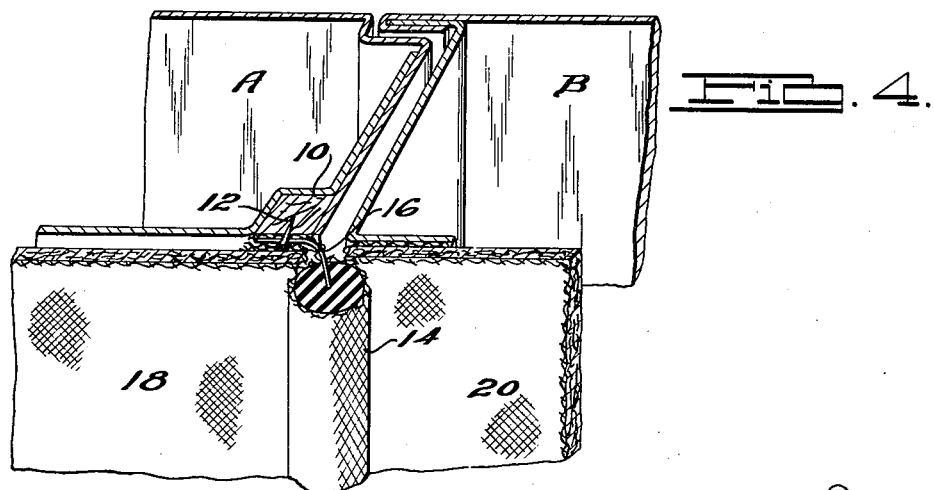
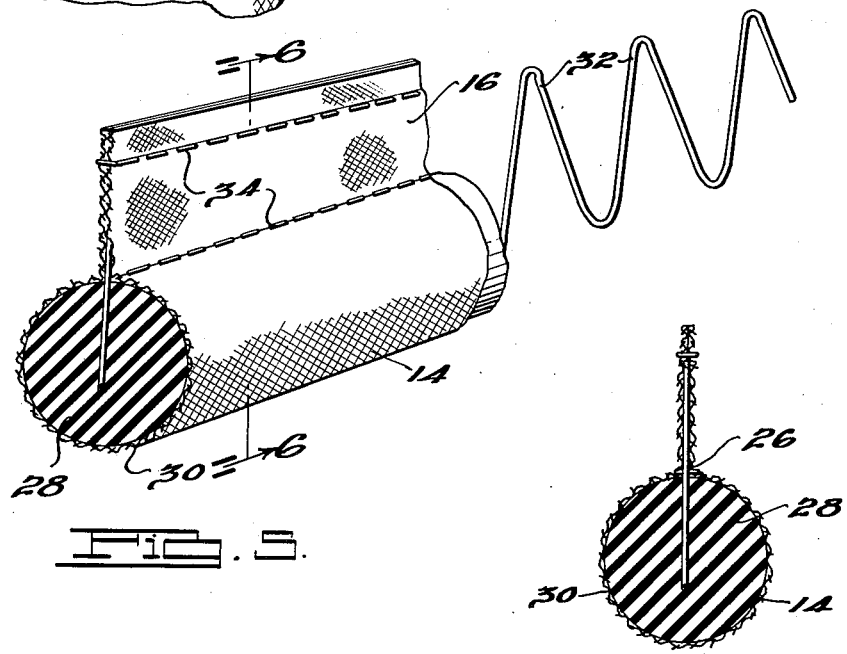
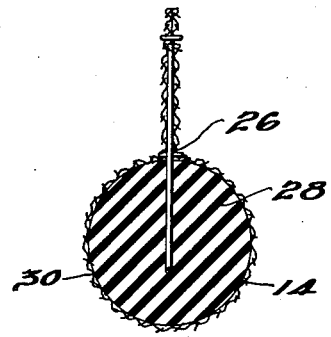
INVENTOR.
Clark A. Tea.
BY
Harness, Lind, Patee & Harris
ATTORNEYS.

Patented Dec. 13, 1938

2,139,780

UNITED STATES PATENT OFFICE 2,139,780

WEATHER STRIP

Clark A. Tea, Detroit, Mich., assignor to Chrysler Corporation, Highland Park, Mich., a corporation of Delaware Application March 27, 1936, Serial No. 71,126

4 Claims. (Cl. 20—69)

This invention relates to a weatherstrip and more particularly to a weatherstrip especially adapted for use on motor vehicle bodies to seal the opening around the doors or windows.

The object of the invention is to provide a weatherstrip which is strong, inherently resilient, and inexpensive to manufacture.

Another object of the invention is to provide a weatherstrip which is free to bend laterally in applying the same to a curved opening.

A further object of the invention is to provide a weatherstrip which has sufficient resiliency to cause it to tightly engage the door or window for sealing purposes and yet adapted to take a permanent set when bent beyond its elastic limit, so that in applying the weatherstrip to an opening it may be bent beyond its elastic limit to conform to any irregularities around the opening and after being bent to that position possesses sufficient resiliency to flex within given limits.

More specifically stated, the invention consists in applying a foraminous metallic material to a cushion member preferably by molding rubber or a similar cushioning material to the opposite faces of a wire mesh body and bending the same to the desired shape.

Other subjects and advantages of the invention will more fully appear in the following description taken in connection with the accompanying drawings, in which:

Fig. 1 is a perspective view, the parts being broken away and in section, of one application of the device as applied to an automobile door opening.

Fig. 2 is a perspective view of the weatherstrip alone, the parts thereof being broken away and in section.

Fig. 3 is a view corresponding to Fig. 2 but showing a modification of the weatherstrip.

Fig. 4 is a view corresponding to Fig. 1 showing a modified form of the invention.

Fig. 5 is a view corresponding to Fig. 2 but showing the form of the weatherstrip shown in Fig. 4.

Fig. 6 is a sectional view taken on line VI—VI of Fig. 5.

Referring to the drawings, I have illustrated a portion of an automobile body frame at A and a door at B. The frame is provided with a tacking insert 10 to which the weatherstrip is secured such as by tacks 12.

The weatherstrip comprises a substantially circular cushion portion 14 and an attached flanged tacking portion 16, the latter being secured to the tacking insert 10. As illustrated, the panel member 18 is secured to the frame A overlapping the flanged tacking portion 16. The inner panel of the door is shown at 20. As shown in Fig. 2 the weatherstrip is preferably formed by molding rubber to the opposite faces of a foraminous body portion 22 illustrated as wire mesh and bending the same back upon itself to provide a substantially tubular portion at one side of the strip and a substantially flat portion at the opposite side of the strip, the latter serving as the attaching portion of the weatherstrip. If desired, the weatherstrip may be formed by preforming the foraminous portion 22 into the shape shown in Fig. 3 and subsequently molding rubber, preferably by extrusion, on the opposite faces of the foraminous body portion 22. After the strip is formed to the shape shown in either Fig. 2 or Fig. 3 a fabric covering may be applied to the weatherstrip and stitched as shown at 24, or the fabric covering may be applied during the molding operation and thereby adhesively secured or vulcanized to the rubber.

It is important to select the proper material for the foraminous portion 22 and if made from wire mesh it has been found that a wire suitable for this purpose should have an elastic limit between 250,000 lbs. per square inch and 350,000 lbs. per square inch and may be formed from what is commonly termed music wire having a diameter of approximately one sixty-fourth of an inch. This wire has a deflection characteristic which when bent within limits is elastic but when bent beyond its limits takes a base set and is elastic from that bent position. This is important when the weatherstrip is applied to an elastic surface. For example, the strip may be manually bent beyond its elastic limit to fit an irregular surface but when so bent it is elastic from that bent position.

If it is desired to have a less flexible weatherstrip a single strand of wire 26 may be formed as shown in Fig. 5 about one edge of which is molded a substantially circular rubber section 28. A covering of fabric material 30 may be applied to the outer periphery of the circular portion 28 and the outwardly extending portion 32 of the wire. The free ends of the fabric may be stitched as at 34 forming a unitary structure. In this form of the invention the wire, together with the fabric, forms the attaching portion 16.

Although but several specific embodiments of the invention have herein been shown and described, it will be understood that various changes in the size, shape and arrangement of parts may be made without departing from the spirit of my invention.

What is claimed is:

1. A weatherstrip comprising a continuous strip of resilient woven wire fabric having rubber molded to its opposite faces and bent upon itself into a substantially hollow loop portion at one edge thereof and a flat portion at the other edge thereof.

2. A weatherstrip comprising a continuous strip of resilient woven wire fabric having rubber molded to its opposite faces and bent upon itself into a substantially hollow loop portion at one edge thereof and a flat portion at the other edge thereof, and a fabric covering over said loop portion and said flat portion.

3. A weatherstrip comprising a continuous strip of resilient foraminous metallic material embedded in a continuous strip of rubber, said parts being folded transversely, forming a continuous loop at one edge thereof and a continuous flat portion at the opposite edge thereof.

4. A weatherstrip comprising a continuous strip of resilient foraminous metallic material embedded in a continuous strip of rubber, said parts being folded transversely, forming a continuous loop at one edge thereof and a continuous flat portion at the opposite edge thereof, and a fabric covering over said loop portion and said flat portion.

CLARK A. TEA.